United States Patent [19]
Sandwell

[11] Patent Number: 5,261,569
[45] Date of Patent: Nov. 16, 1993

[54] SQUEEZABLE CONTAINER FOR LIQUID MATERIAL HAVING A DETACHABLE MEASURING CAP

[75] Inventor: Gerald R. Sandwell, Grimsby, Canada

[73] Assignee: The Procter & Gamble Company, Cincinnati, Ohio

[21] Appl. No.: 968,660

[22] Filed: Oct. 30, 1992

[30] Foreign Application Priority Data

Oct. 31, 1991 [EP] European Pat. Off. ...... 91870171.5

[51] Int. Cl.⁵ ............................................. B67D 5/06
[52] U.S. Cl. .................................. 222/205; 222/207; 222/158
[58] Field of Search ................ 222/205, 207, 211, 212, 222/546, 158

[56] References Cited

U.S. PATENT DOCUMENTS

| | | | |
|---|---|---|---|
| 3,203,454 | 8/1965 | Micallef | 222/205 X |
| 4,077,547 | 3/1978 | Donoghue | 222/207 |
| 4,106,673 | 8/1978 | Donoghue | 222/207 |
| 4,377,247 | 3/1983 | Hazard et al. | 222/517 |
| 4,474,312 | 10/1984 | Donoghue | 222/205 |
| 4,607,762 | 8/1986 | Zulauf et al. | 222/48 |
| 4,696,416 | 9/1987 | Muckenfuhs et al. | 222/109 |
| 4,971,226 | 11/1990 | Donoghue | 222/207 |

FOREIGN PATENT DOCUMENTS

| | | |
|---|---|---|
| 0484528A1 | 5/1992 | European Pat. Off. . |
| 2752-669 | 5/1979 | Fed. Rep. of Germany . |
| 3241054A | 5/1984 | Fed. Rep. of Germany . |
| 3819098A | 6/1988 | Fed. Rep. of Germany . |
| 2637-366-A | 4/1990 | France . |
| 47-4786 | 2/1972 | Japan . |
| 47-4790 | 2/1972 | Japan . |
| 63-35973 | 9/1985 | Japan . |
| 63-44630 | 6/1986 | Japan . |
| 61-99568 | 6/1986 | Japan . |
| WO91/00833 | 1/1991 | Japan . |

*Primary Examiner*—Gregory L. Huson
*Attorney, Agent, or Firm*—William Scott Andes; E. Kelly Linman

[57] ABSTRACT

A squeezable container for containing liquids is provided with a transparent measuring cap into which the container's contents can be dispensed by squeezing the container in an upright position. Through a discharging pipe liquid is transported from the container into the measuring space, the bottom of which is formed by an inner plug. To maintain accurate dosing, the transparent measuring cap is detachably connected to the container for cleaning purposes while leaving the plug and the discharging pipe in place.

21 Claims, 5 Drawing Sheets

SQUEEZABLE CONTAINER FOR LIQUID MATERIAL HAVING A DETACHABLE MEASURING CAP

FIELD OF THE INVENTION

The invention relates to a squeezable container for containing liquid materials comprising a neck portion having a pouring orifice, an inner plug covering the pouring orifice, the inner plug comprising a discharging pipe, a transparent measuring cap having an outer circumferential wall which is connected to the neck portion of the container and a top wall covering the circumferential outer wall, the top wall comprising a pouring mouth and an upper cap for covering the pouring mouth, the outer circumferential wall, the top wall and the inner plug enclosing a measuring space, the discharging pipe extending into the container and into the measuring space for transfer of liquid from the container into the measuring space.

BACKGROUND OF THE INVENTION

Such a squeezable container is described in WO-9100833.

In this patent application a squeezable bottle is disclosed having a measuring cap enabling constant volume extraction by squeezing the bottle. By squeezing the bottle the liquid contents are forced through a supply pipe, via the discharging pipe into the measuring chamber. Since a volume of the liquid in excess of the height of the liquid exit of the discharging pipe returns into the bottle when the bottle restores its original shape, the liquid is stored in the measuring chamber by the volume up to the lower end of the opening of the liquid exit. Then, in the known measuring cap, since the measuring chamber is made of a single wall and the cap main body is made of transparent material, a liquid of a volume less than the above-mentioned constant volume can be extracted under measurement by applying squeezing while observing, from the outside, the volume of the liquid flowing into the measuring chamber. In addition, the bottom wall of the measuring chamber can be slanted so that a small volume is gathered at the circumference of the bottom wall thereby enabling easy observation, even for a small volume of liquid, and making it possible to exactly extract such a small volume.

Since the known measuring cap has a simple structure which facilitates the assembling of the cap and capping to the bottle, and furthermore the circumferential walls of the liquid measuring chamber do not overlap, some amount of material to be used is saved, hence reducing cost.

Since the known measuring cap can be completely sealed, the liquid remaining in the measuring chamber, after use, does not spill out of the chamber when the bottle falls down.

To extract the liquid from the measuring chamber, the upper cap can be opened by one touch and the liquid can be extracted simply. Preferably the pouring mouth is displaced from the center and situated near the circumferential wall of the measuring chamber allowing for easy dispersing of a small volume of liquid remaining after extraction. Further, upon assembling the measuring cap, the inner plug is set such that the direction aligning means formed on the circumferential wall of the measuring chamber and the engaging outer wall of the inner plug fit the liquid exit of the discharging pipe at an angle deviated from the direction of the pouring mouth, thereby enabling to prevent the liquid contents from splashing out of the pouring mouth even when the bottle is strongly squeezed.

OBJECT OF THE INVENTION

It is an object of the invention to provide for a squeezable container of the kind as described in WO 9100833 in which the accurate dosing characteristics are maintained under prolonged use and after periods of storage.

It is another object of the invention to provide for a squeezable container allowing for accurate dosing of relatively viscous and/or opaque liquids.

SUMMARY OF THE INVENTION

A squeezable container according to the invention is characterized in that for cleaning of the measuring cap, the measuring cap can at least partly be removed from the container while leaving the inner plug in place.

It was recognized by the inventor that for the known measuring cap soiling of the inside of the transparent measuring cap by the contents of the container, seriously hinders the visibility of the liquid level inside the measuring cap. Reduced visibility of the liquid inside the measuring cap hampers accurate dispensing of the container's liquid contents, to which purpose the known measuring cap has been optimized.

Especially for concentrated products of which only small amounts need to be dispensed, such as concentrated dishwashing liquids, concentrated liquid detergents or concentrated laundry softeners, the accurate dosing is essential for economic product-use. Due to the relatively viscous and opaque nature of the above-mentioned liquids, adherence to the walls of the dosing cap will easily occur, even though the pouring mouth of the measuring cap can be sealed by the upper cap, and visibility of the measuring cap's contents will be reduced. Also for relatively viscous transparent liquids a reduction of visibility may occur. Although the soiling of the walls of the measurement chamber may for transparent liquids not be of the same degree as for opaque liquids, the transparent liquids are less visible against the background in the measuring chamber so that a relatively little amount of soiling can reduce their visibility as much as in case of opaque liquids.

The recognition of this disadvantage leads according to the invention, to a measuring cap that can be removed from the container while leaving the inner plug in place, despite the possible cost disadvantage that occurs compared to the known measuring cap wherein the measuring cap and the plug are executed as one integral piece. Leaving the inner plug in place upon removal of the measuring cap for cleaning, prevents product loss by liquid spilling from the discharging pipe that would occur when the inner plug and the discharging pipe, that preferably extends to the bottom of the container, were removed from a partially filled container.

From the American Patent U.S. Pat. No. 4,696,416, a container is known having a neck to which a plug is fixed, the plug having a pouring spout. The plug comprises a collar having an internal screw thread that engages with an outer screw thread of a measuring cap that closes off the pouring spout. When an amount of liquid is to be poured from the bottle, the measuring cap is unscrewed and the liquid is poured from the bottle into the measuring cap. By observing the liquid level in the measuring cap from the top, a predetermined amount of liquid is dispensed. When the measuring cap is replaced on the bottle, liquid remaining on the sides of the measuring cap can reflow via the plug back into the bottle. Bottles of the above mentioned type differ from the container according to the invention in that the measuring cap of the known bottle must be removed from the bottle before pouring. For the measuring of the liquid level it is in no way essential for the measuring cap to be transparent, since the liquid level is observed from the top.

Since a soiled cap does, for the known bottles mentioned above, not hamper the dispensing function, cleaning of the measuring cap is not of prime concern, although of course possible. The reflow feature of these known bottles however will encourage not to rinse the measuring cap after use since liquid remaining on the walls of the cap will reflow into the bottle, rinsing the cap implying unnecessary product loss.

The measuring cap of the bottle according to the invention has been designed for facilitating the dispensing action by remaining fixed to the bottle during dispensing. Thereby one-handed use of the bottle is possible. Providing the bottle disclosed in WO 9100833 with an unscrewable measuring cap could seem contradictory to the principle of the cap being fixed during the dispensing action. However, due to the essence of a clean transparent measuring cap for such a bottle, providing a measuring cap that can be easily removed from the bottle during non-dispensing, without having to take the discharging pipe from the bottle, has a synergetic effect.

An embodiment of a squeezable container in accordance with the invention wherein the outer circumferential wall comprises a neck-engaging wall part which is detachably connected to the container's neck via a screw-thread is characterized in that the inner plug is directly connected to an interior wall of the container's neck portion.

Connecting the plug directly to the container's neck, such that it is not held in place by the measuring cap, allows for separate removal of the measuring cap from the bottle.

The inner plug can be press-fitted to the inside of the container's neck, but is preferably detachably connected thereto to allow for removal of the plug for refilling of the container.

An embodiment of a squeezable container according to the invention is characterized in that the outer circumferential wall comprises an upper and a lower segment, which are mutually detachably connected, the lower segment comprising the neck-engaging wall part to which the inner plug is directly connected.

Forming the measuring cap into an upper and a lower segment, allows for removal of the upper segment while leaving the lower segment and the plug in place. For refilling the container, the lower segment is removed from the bottle together with the inner plug. The inner plug can be press-fitted to the lower segment or form an integral part therewith.

The number of parts of the measuring cap according to the invention, is reduced and assembling and handling upon use of the cap main body can be facilitated by integrally molding with the cap an upper cap for closing the pouring mouth, the upper cap being connected by means of a spring hinge near the top of the circumferential wall of the measuring chamber. Further, more exact extraction of a small volume is enabled by slanting the bottom wall of the measuring chamber outwardly and downwardly between the discharging pipe and the engaging outer wall.

By forming the pouring mouth at a position displaced from the center, extraction of the container's contents is facilitated. Furthermore, the liquid is prevented from splashing to the outside even when the squeezing is applied while leaving the upper cap Tbft open by forming the liquid discharging aperture of the discharging pipe slit-width near the closed top of the discharging pipe and forming a direction aligning means for engaging the inner plug to the cap or the container's neck portion such that the liquid discharging aperture of the inner plug is displaced from the direction of the pouring mouth of the cap.

BRIEF DESCRIPTION OF THE DRAWINGS

Some embodiments of a measuring cap according to the invention will be explained with reference to the accompanying drawings, in which.

DETAILED DESCRIPTION OF THE INVENTION

Figure 1:
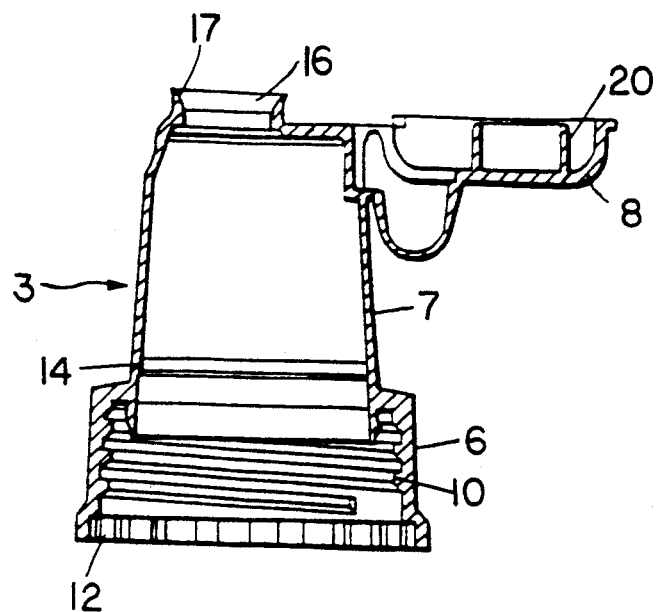
FIG. 1 is a front elevational cross sectional view of a cap main body.
Figure 2:
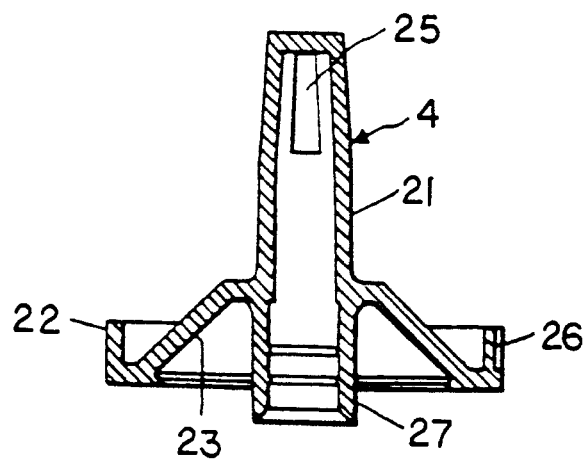
FIG. 2 is a front elevational cross sectional view of an inner plug.
Figure 3:
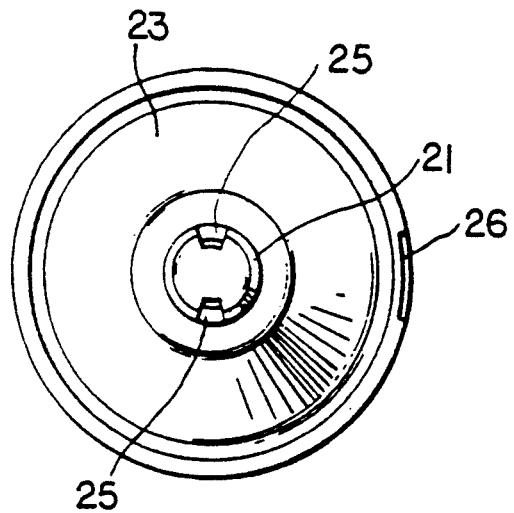
FIG. 3 is a plan view of the inner plug of FIG. 2.

A measuring cap 1 according to the present invention comprises a cap main body 3, an inner plug 4 and supply pipe 5. The cap main body 3 can be integrally constituted with a bottle neck engaging wall 6 formed with threads for screw-coupling with a bottle neck portion 30, a circumferential wall 7 enclosing a measuring chamber 9, a top wall 15 of the measuring chamber formed with a pouring mouth 16, and a cap 8 connected by way of a spring hinge to the top of the measuring chamber having a bung for closing the pouring mouth of the measuring chamber. A plurality of ratchet fingers 12 are formed below threads 10 on the bottle neck engaging wall 6 for meshing with a ratchet formed to the bottle neck.

The circumferential wall 7 for the measuring chamber has a cylindrical shape having a top and is slightly tapered above the bottle neck engaging portion.

Further, the pouring mouth 16 that is formed at the top wall 15 of the measuring chamber, is displaced from the center for facilitating the discharge of liquid and reducing the volume of remaining liquid. Accordingly, the pouring mouth is made smaller to facilitate discharge as compared with the conventional case in which the top of the measuring chamber is entirely opened to constitute a pouring mouth. Further, as shown in the drawing, the pouring mouth 16 has an outwardly extended tapered wall 17, and a ring-like protrusion 18 is formed therebelow such that the bung of the cap is tightly engaged therewith. This makes the bung to engage more reliably to the pouring mouth and attain tight sealing, improve the liquid draining upon discharge and prevent dripping. The upper cap 8 is hinged at three points near the top of the measuring chamber 9 and an annular bung 20 is formed on the inner surface of the cap for engaging the pouring mouth.

The inner plug 4 has a discharging pipe 21 at the central portion and an engaging outer wall 22 at the outer circumference for engaging the circumferential wall 7 of the measuring chamber or the neck portion 30 of the bottle, the discharging pipe 21 and the engaging outer wall 22 being connected by means of a bottom wall 23 of the measuring chamber 9, the bottom wall 23 being slanted outwardly and downwardly. The top of the discharging pipe 21 is closed and a groove of a predetermined length is cut vertically from the top to form a liquid discharging aperture 25. Further, a direction aligning recess 26 for aligning the direction of the inner plug can be formed to the engaging outer wall 22, so that the liquid discharging aperture 25 is situated in the direction being derivated by 90° from the direction of the pouring mouth 16, the recess engaging the direction aligning protrusion 13 that can be formed to the circumferential wall of the measuring chamber. The lower portion of the discharging pipe 21 is extended downwardly from the bottom wall 23 to constitute a supply pipe engaging portion 27 for connection to the supply pipe 5.

Figure 4:
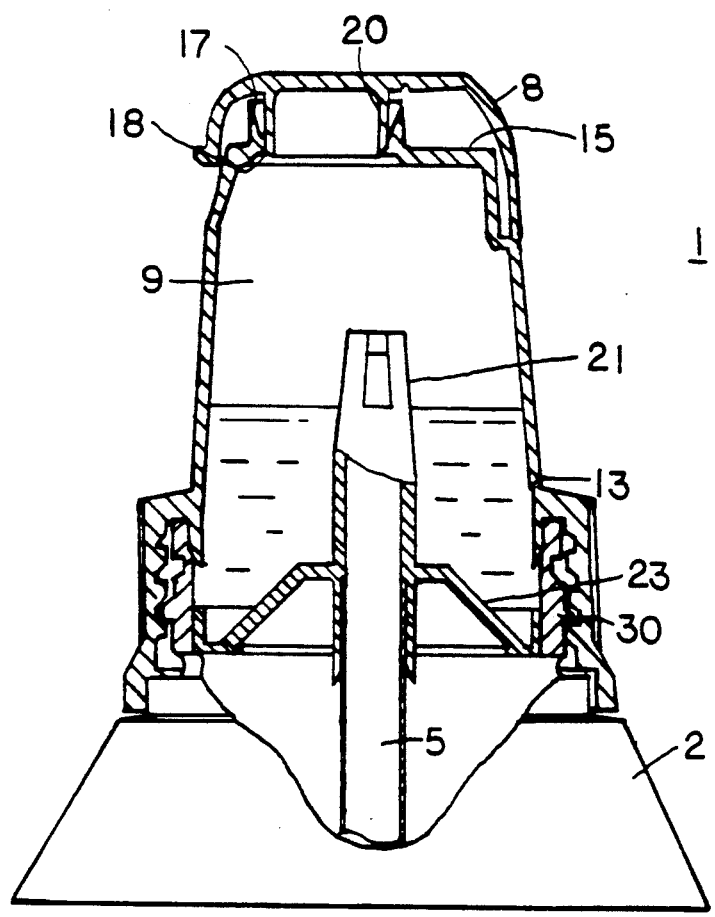
FIG. 4 is a front elevational cross sectional view in which the inner plug is fixed to the neck of a bottle.
Figure 5:
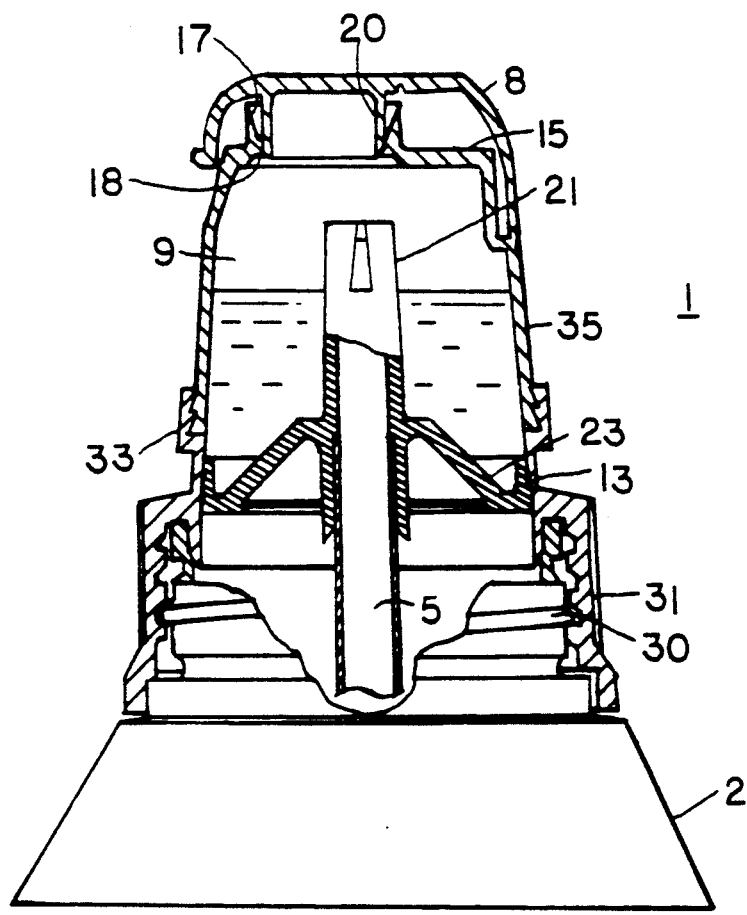
FIG. 5 is a front elevational cross sectional view in which the measuring cap comprises an upper and a lower section.
Figure 6:
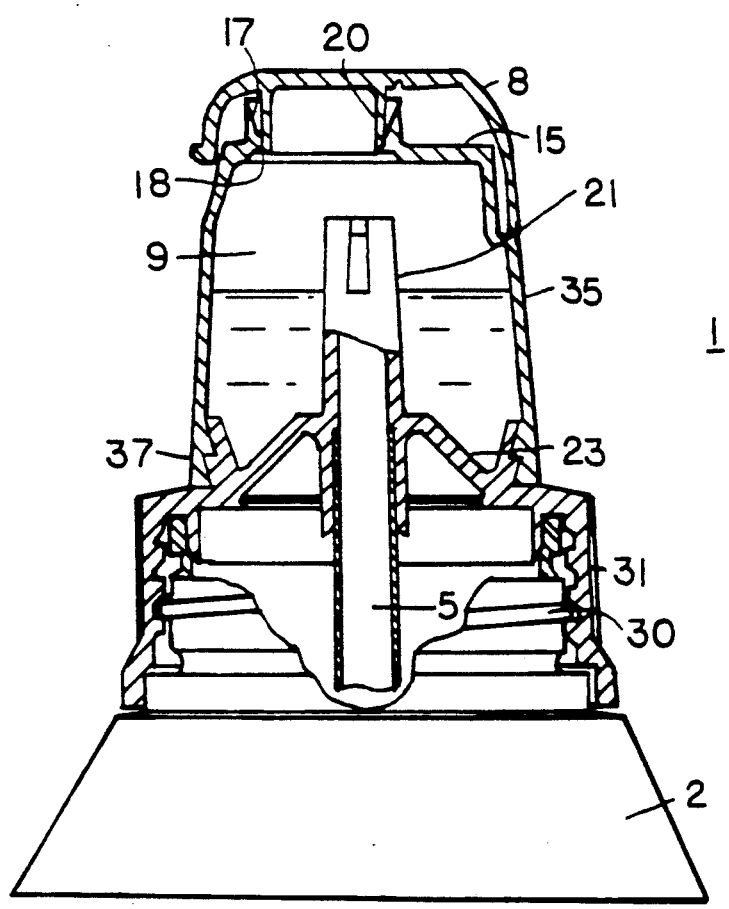
FIG. 6 is a front elevation cross sectional view in which the measuring cap comprises an upper and a lower section, the inner plug being an integral part of the lower section.
Figure 7:
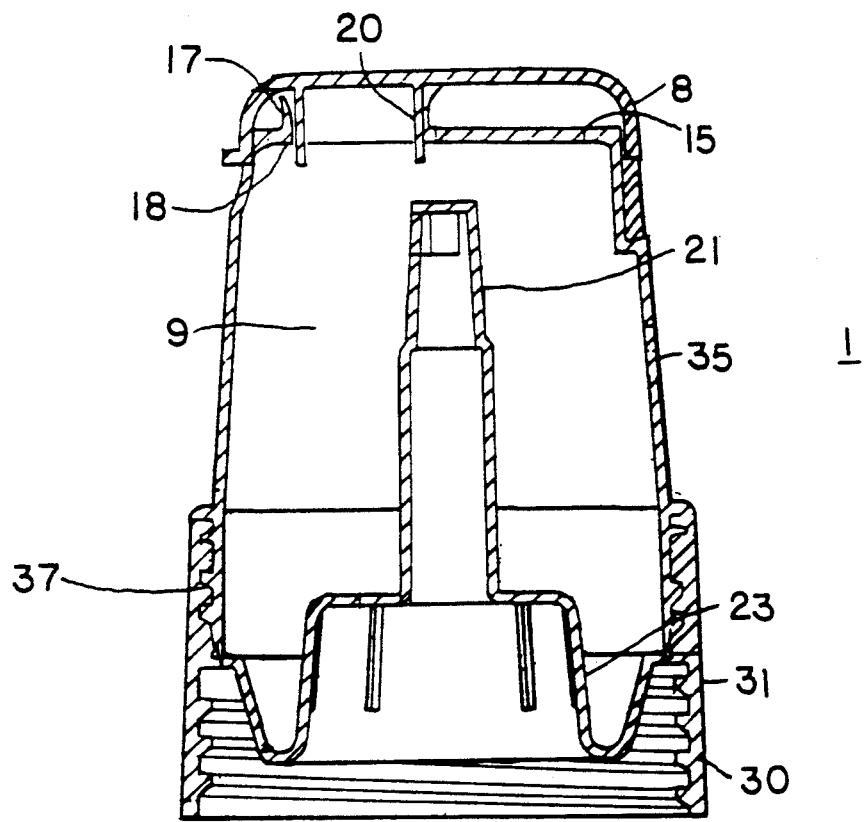
FIG. 7 is a front elevation cross sectional view in which the measuring cap is fixed to the neck of the container by means of a sleeve.

FIG. 4 shows an embodiment of the measuring cap in which the inner plug 4 is connected to the bottle neck 30. For cleaning, the whole measuring cap can be unscrewed and rinsed while the inner plug 4 and the supply pipe 5 remain in place. To facilitate refillability of the bottle, the inner plug 4 is preferably connected to a lower segment 31 of the measuring cap 7, as shown in FIG. 5, the lower segment 31, comprising the wall-engaging part 6. The lower segment 31 need not be transparent. The wall-engaging part can be equipped with a press-fitting portion 14 to correctly orientate the discharging aperture 25 with respect to the pouring mouth 16 upon contacting the press-fitting portion 14 with the inner plug 4. The inner plug 4 can also be formed as an integral part of the lower segment 31. Via a screw thread 33, that has been schematically indicated, the upper segment 35 is detachable from the lower segment 31 for cleaning. Removing the lower segment 31 allows for easy refilling of the bottle. FIG. 6 shows an embodiment in which the lower segment 31 and the inner plug 4 are forming one integral piece to which the upper segment 35 of the measuring cap is connected via schematically indicated screw thread 37. For bottles for which no refilling is desired, the lower segment 31 can be fixed to the neck portion 30 in a permanent manner rather than by means of a screw thread, such as for instance by press-fitting. In the embodiment of FIG. 7 the lower segment 31 is formed by a sleeve, that is press-fitted to the neck portion 30. The plug 4 is an integral part of the sleeve 31.

The measuring cap as shown in FIG. 5 is assembled by engaging the supply pipe 5 of a length reaching the bottom of the bottle to the inner plug 4, and engaging the inner plug 4 to the cap main body 3, so that the circumferential wall 7 of the measuring chamber of the cap main body and the measuring chamber bottom wall 23 of the inner plug constitute the measuring chamber.

In this case, when the inner plug 4 is set such that the direction aligning protrusion 13 formed to the circumferential wall of the measuring chamber engages the direction aligning recess 26 formed to the engaging circumferential wall 22 of the inner plug, the liquid discharge aperture 25 of the discharging pipe is engaged at an angle deviated by 90° with respect to the pouring mouth 16 to prevent the inner liquid from splashing to the pouring mouth when the bottle 2 is strongly squeezed.

When the measuring cap 1 previously assembled in this way is screw-coupled with the neck portion 30 of the bottle 2 charged with the liquid till it engages a thread stopper and turns no more, capping can be attained simply in a position where the pouring mouth 16 is always situated in a specific direction. Then, the ratchet fingers 12 of the measuring cap main body mesh with the ratchet at the bottle neck in this position to each other to attain antislackening of threads, by which the cap main body is firmly fixed to the bottle neck.

Upon use, by squeezing the bottle 2, the inner liquid flows out through the supply pipe 5 into the measuring chamber 9. When the liquid in the measuring chamber reaches the height at the liquid discharging aperture 25 of the discharging pipe 21, and since the volume of liquid exceeding this level returns into the bottle when the bottle restores its original shape, the liquid is stored in the measuring chamber by a volume up to the lower end of the opening of the liquid discharging aperture to enable constant volume discharging. In addition, by applying squeezing while observing the volume of the liquid in the measuring chamber from the outside, the liquid in a volume less than the predetermined constant volume can be measured and discharged, so that a desired volume of liquid can always be discharged. Then, the liquid can be discharged from the measuring chamber in one touch by opening the hinge cap and tilting the bottle.

If graduations for measurement are disposed appropriately on the circumferential wall of the measuring chamber, more exact measuring and extraction are enabled.

Although the present invention has been illustrated with reference to a preferred embodiment as described above, the present invention is not limited to the above mentioned embodiment but various design modifications are possible. For instance, the upper cap for closing the pouring mouth of the cap main body may be disposed as a member separate from the cap main body. In a case where it is integrated, the hinge may be a hinge of a usual connection member instead of the spring hinge. Further, it is also possible to form a pouring mouth at the center of the cap and make the bottom wall of the measuring chamber horizontal. Further, the liquid discharging aperture of the discharging pipe can be formed by merely opening the top end. Furthermore, as the direction aligning means for engaging the inner plug to the cap main body, it is possible to form a recess at the upper end of the circumferential wall of the inner plug and a ridge or a protrusion may be formed to the circumferential wall of the measuring chamber for engaging said recess from above.

I claim:

1. A squeezable container for containing liquid materials comprising:
   an upper portion formed as a neck, said neck having a pouring orifice;

an inner plug covering said pouring orifice, said inner plug further comprising a discharging pipe extending upwardly away from said orifice to a top portion, said discharging pipe further including a liquid discharging aperture near said top portion, said inner plug further comprising a supply pipe extending downwardly within said container, and said inner plug further comprising a bottom wall extending generally radially outwardly from said discharging pipe;

a measuring cap having a generally cylindrical outer circumferential wall which surrounds said inner plug, said outer circumferential wall further having a neck engaging wall at a first end for engaging said neck, said outer circumferential wall further having a top wall formed with a pouring mouth at a second end, said inner plug being located between said first end and said second end;

said measuring cap further including an upper closure for closing said pouring mouth; and said outer circumferential wall further comprising an upper segment and a lower segment which are detachably joined to one another by a connection adjacent to said inner plug, said connection being located substantially below the level of said liquid dispensing aperture, and said lower segment comprising said neck engaging wall;

whereby said bottom wall, said outer circumferential wall, and said top wall cooperate to define a tightly enclosed measuring chamber, and whereby said upper segment can be readily removed from said lower segment to facilitate cleaning of said measuring cap while said inner plug remains covering said pouring orifice.

2. A squeezable container as defined in claim 1, wherein said neck engaging wall is connected to said neck by screw threads.

3. A squeezable container as defined in claim 1, wherein said connection comprises screw threads.

4. A squeezable container as defined in claim 1, wherein said inner plug is integrally formed with said lower segment.

5. A squeezable container as defined in claim 4, wherein said neck engaging wall comprises a sleeve which is press-fitted to said neck.

6. A squeezable container as defined in claim 1, wherein said upper closure has a bung engaging said pouring mouth, said upper closure being integrally molded with said cap main body while being connected to said cap main body by a hinge near said second end of said outer circumferential wall.

7. A squeezable container as defined in claim 6, wherein said hinge is a spring hinge.

8. A squeezable container as defined in claim 1, wherein said bottom wall is slanted downwardly and outwardly between said discharging pipe and said outer circumferential wall.

9. A squeezable container as defined in claim 1, wherein said pouring mouth is formed at a position offset toward one side of said top wall.

10. A squeezable container as defined in claim 9, wherein said discharging pipe is closed at said top portion and said liquid discharging aperture constitutes a slit near said top portion.

11. A squeezable container as defined in claim 10, wherein said inner plug further comprises a direction aligning recess and said outer circumferential wall further comprises a direction aligning protrusion, said direction aligning recess being sized and disposed to engage said direction aligning protrusion, whereby said direction aligning recess and said direction aligning protrusion cooperate to secure said inner plug within said outer circumferential wall thus preventing relative rotation between said inner plug and said outer circumferential wall while maintaining said liquid discharging aperture 90 degrees out of alignment with said pouring mouth.

12. A measuring cap for use with a squeezable container for containing liquid materials, said container having a squeezable lower portion and an upper portion formed as a neck, said neck having a pouring orifice, said measuring cap comprising:

an inner plug covering said pouring orifice, said inner plug further comprising a discharging pipe extending upwardly away from said orifice to a top portion, said discharging pipe further including a liquid discharging aperture near said top portion, said inner plug further comprising a supply pipe extending downwardly within said container, and said inner plug further comprising a bottom wall extending generally radially outwardly from said discharging pipe;

a generally cylindrical outer circumferential wall which surrounds said inner plug, said outer circumferential wall further having a neck engaging wall at a first end for engaging said neck, said outer circumferential wall further having a top wall formed with a pouring mouth at a second end, said inner plug being located between said first end and said second end;

said measuring cap further including an upper closure for closing said pouring mouth; and said outer circumferential wall further comprising an upper segment and a lower segment which are detachably joined to one another by a connection adjacent to said inner plug, said connection being located substantially below the level of said liquid dispensing aperture, and said lower segment comprising said neck engaging wall;

whereby said bottom wall, said outer circumferential wall, and said top wall cooperate to define a tightly enclosed measuring chamber, and whereby said upper segment can be readily removed from said lower segment to facilitate cleaning of said measuring cap while said inner plug remains covering said pouring orifice.

13. A measuring cap as defined in claim 12, wherein said neck engaging wall is connected to said neck by screw threads.

14. A measuring cap as defined in claim 12, wherein said connection comprises screw threads.

15. A measuring cap as defined in claim 12, wherein said inner plug is integrally formed with said lower segment.

16. A measuring cap as defined in claim 15, wherein said neck engaging wall comprises a sleeve which is press-fitted to said neck.

17. A measuring cap as defined in claim 12, wherein said upper closure has a bung engaging said pouring mouth, said upper closure being integrally molded with said cap main body while being connected to said cap main body by a spring hinge near said second end of said outer circumferential wall.

18. A measuring cap as defined in claim 12, wherein said bottom wall is slanted downwardly and outwardly between said discharging pipe and said outer circumferential wall.

19. A measuring cap as defined in claim 12, wherein said pouring mouth is formed at a position offset toward one side of said top wall, and wherein said discharging pipe is closed at said top portion and said liquid discharging aperture constitutes a slit near said top portion.

20. A measuring cap as defined in claim 19, wherein said inner plug further comprises a direction aligning recess and said outer circumferential wall further comprises a direction aligning protrusion, said direction aligning recess being sized and disposed to engage said direction aligning protrusion, whereby said direction aligning recess and said direction aligning protrusion cooperate to secure said inner plug within said outer circumferential wall thus preventing relative rotation between said inner plug and said outer circumferential wall while maintaining said liquid discharging aperture 90 degrees out of alignment with said pouring mouth.

21. A squeezable container for containing liquid materials comprising:
   an upper portion formed as a neck, said neck having a pouring orifice;
   an inner plug covering said pouring orifice, said inner plug further comprising a discharging pipe extending upwardly away from said orifice to a top portion, said discharging pipe further including a liquid discharging aperture near said top portion, said discharging pipe being closed at said top portion and said liquid discharging aperture constituting a slit near said top portion, said inner plug further comprising a supply pipe extending downwardly within said container, and said inner plug further comprising a bottom wall extending generally radially outwardly from said discharging pipe, said bottom wall being slanted downwardly and outwardly from said discharging pipe;
   a measuring cap having a generally cylindrical outer circumferential wall which surrounds said inner plug, said outer circumferential wall further having a neck engaging wall at a first end for engaging said neck, said outer circumferential wall further having a top wall formed with a pouring mouth at a second end, said pouring mouth being formed at a position offset toward one side of said top wall, said inner plug being located between said first end and said second end;
   said measuring cap further including an upper closure for closing said pouring mouth;
   said outer circumferential wall further comprising an upper segment and a lower segment which are detachably joined to one another by a threaded connection adjacent to said inner plug, said threaded connection being located substantially below the level of said liquid dispensing aperture, and said lower segment comprising said neck engaging wall; and
   said inner plug further comprising an engaging outer wall at the outer circumference of said bottom wall extending upwardly from said bottom wall generally parallel to said lower segment, said engaging outer wall further comprising a direction aligning recess and said lower segment further comprising a direction aligning protrusion, said direction aligning recess being sized and disposed to engage said direction aligning protrusion, whereby said direction aligning recess and said direction aligning protrusion cooperate to secure said inner plug within said outer circumferential wall thus preventing relative rotation between said inner plug and said outer circumferential wall while maintaining said liquid discharging aperture 90 degrees out of alignment with said pouring mouth;
   whereby said bottom wall, said outer circumferential wall, and said top wall cooperate to define a tightly enclosed measuring chamber, and whereby said upper segment can be readily removed from said lower segment to facilitate cleaning of said measuring cap while said inner plug remains covering said pouring orifice.

* * * * *